UNITED STATES PATENT OFFICE.

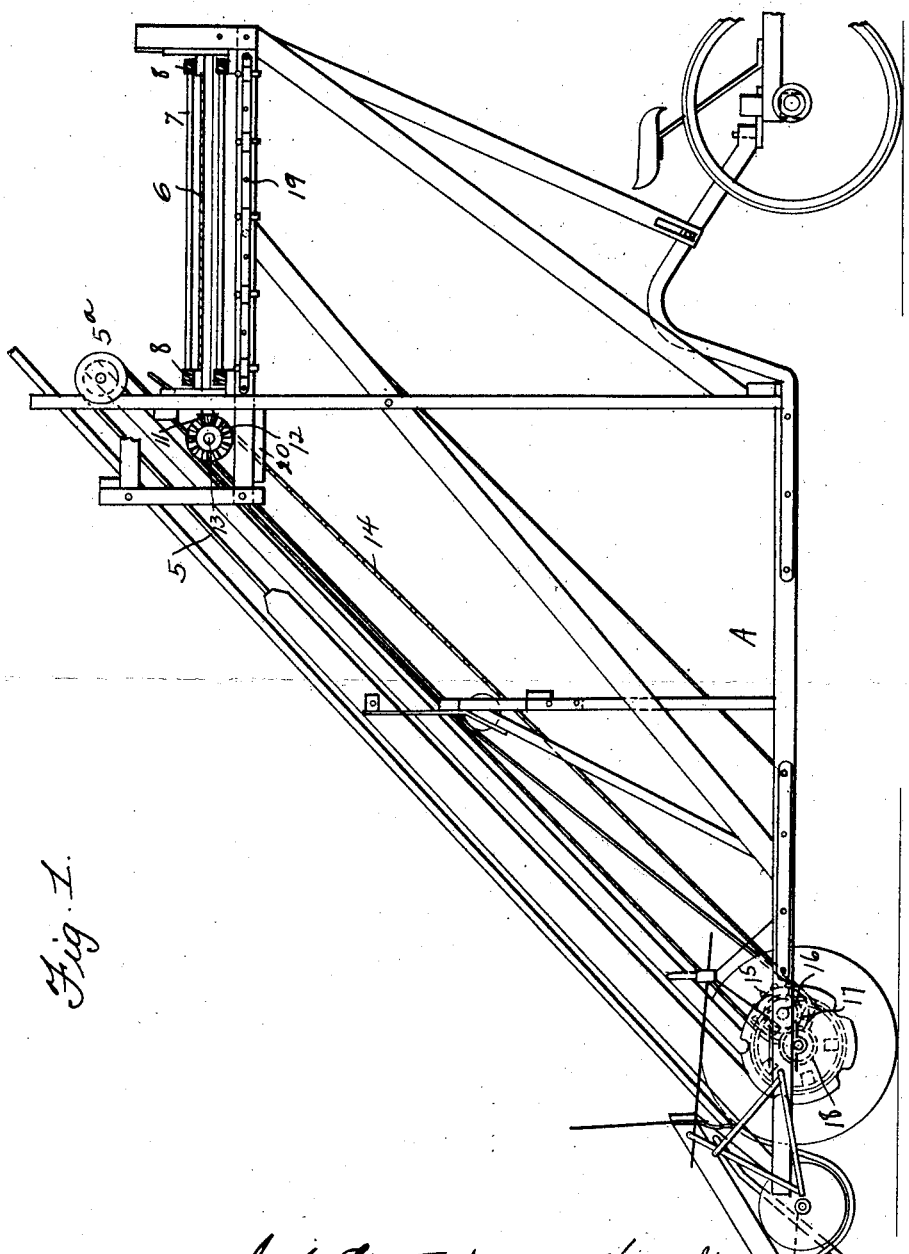

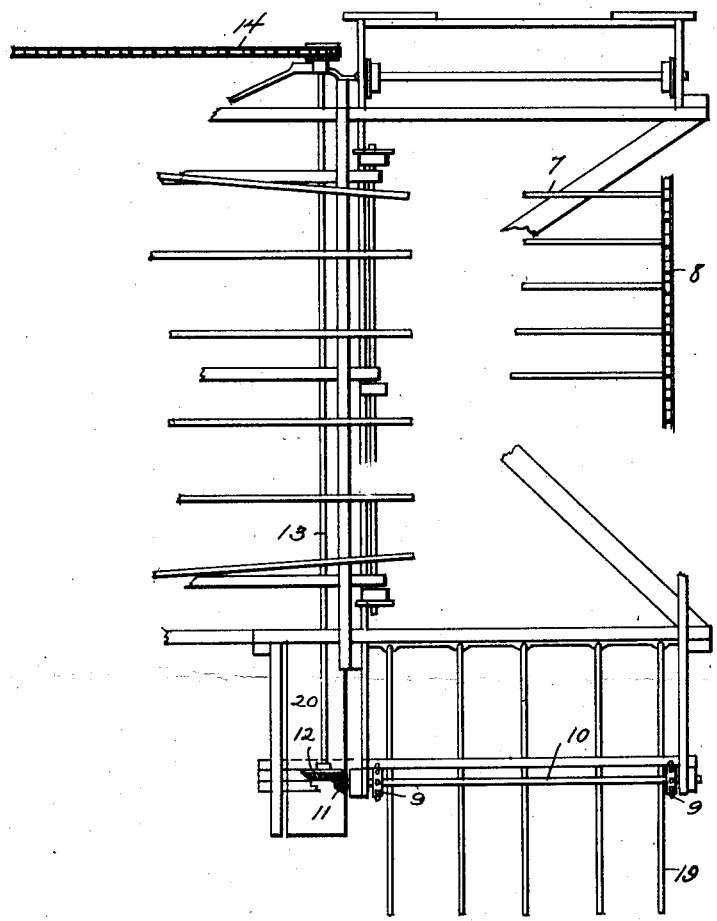

JOHN G. TAYLOR AND HIRAM STOKER, OF LOVELOCK, NEVADA.

ATTACHMENT FOR HAY LOADERS.

1,405,808.      Specification of Letters Patent.      Patented Feb. 7, 1922.

Application filed July 20, 1920. Serial No. 397,733.

*To all whom it may concern:*

Be it known that we, JOHN G. TAYLOR and HIRAM STOKER, citizens of the United States of America, residing at Lovelock, in the county of Pershing and State of Nevada, have invented certain new and useful Improvements in Attachments for Hay Loaders, of which the following is a specification.

This invention relates to attachments for hay loaders its object being to provide an attachment of such a nature that the operation of the hay loader need not be interrupted during the time that one receiving vehicle is being substituted for another.

Further objects and advantages of the invention will be set forth in the detailed description which now follows.

In the accompanying drawing—

Figure 1 is a side elevation of an ordinary hay loader having the attachment applied thereto;

Fig. 2 is a plan view of the upper part of the hay loader showing the attachment.

Like numerals designate corresponding parts in all of the figures of the drawing.

In the drawing A designates a conventional hay loader. Many hayloaders include inclined conveyers such as indicated at 5 by which the hay is elevated and from which the hay is delivered at the upper end thereof. In carrying out the invention, we mount beneath the discharge end 5ª of the conveyer 5 a transverse conveyer bed 6 over which the flights 7 of a laterally acting conveyer travel. These flights are carried by chains 8 which pass over sprocket wheels 9 of a shaft 10, said shaft carries a bevel pinion 11 which meshes with the bevel gear wheel 12 that is fast upon a transverse shaft 13. This shaft is driven by a sprocket chain 14 from any suitable moving part of the hay loader such, for example, as a sprocket wheel 15 on a shaft 16 that carries a spur gear 17 meshing with a corresponding gear 18 on the shaft of one of the cylinders of the hay loader.

Hay that is delivered over the upper end of the main conveyer 5 is discharged therefrom upon the conveyer bed and is delivered by the laterally acting conveyer upon fingers 19. These fingers extend some distance beyond the sides of the hay loader and serve as a receiving element upon which the hay may be retained for any desired length of time and particularly when a loaded vehicle is being driven away and another vehicle substituted therefor beneath the discharge end of the conveyer.

The driver of the wagon drives along with the hay loader with the wagon disposed under the conveyer varying his speed so that the hay may be deposited on different parts of the wagon. When loaded he turns away from the machine and an empty wagon comes under the discharge end of the laterally acting conveyer. The loader man on the platform 20 holds the hay on the rods or fingers 19 with a pitchfork during the few seconds that are necessary to change the wagon. Thus the delay of changing the hay loader from one wagon to another is avoided.

From the foregoing description it will be seen that simple and efficient means are herein provided for carrying out the objects of the invention. However, it is to be understood that the invention is not limited to the precise construction set forth but that it includes within its purview whatever changes fairly come within either the terms or the spirit of the appended claims.

Having described our invention, what we claim is—

1. A hayloader comprising a portable frame, an inclined conveyor supported thereon and acting longitudinally of the frame, a transversely acting conveyor disposed beneath the discharge end of the first named conveyor, a plurality of laterally projecting fingers extending in the general direction of the movement of the transversely acting conveyor and projecting beyond the discharge end of the transversely acting conveyor and lying in a substantially horizontal plane and projecting beyond the line of travel of the hay loader.

2. A hay loader comprising a portable frame, an inclined conveyer thereon acting longitudinally thereof, a transversely disposed conveyer bed beneath the discharge end of the first named conveyer, slats traveling over said bed, laterally projecting fingers upon which the transversely disposed conveyer discharges and a platform disposed adjacent said fingers.

3. A structure as recited in claim 2 in combination with means for driving the laterally acting conveyer from a moving part of the hay loader.

In testimony whereof we affix our signatures in the presence of two witnesses.

JOHN G. TAYLOR.
                  HI STOKER.

Witnesses:
    W. C. NOTMOND,
    V. A. TWIGG.